(12) United States Patent
Saori

(10) Patent No.: US 7,016,119 B2
(45) Date of Patent: Mar. 21, 2006

(54) ZOOM LENS SYSTEM

(75) Inventor: Masakazu Saori, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/929,364

(22) Filed: Aug. 31, 2004

(65) Prior Publication Data

US 2005/0046960 A1    Mar. 3, 2005

(30) Foreign Application Priority Data

Sep. 1, 2003  (JP)  ............................. 2003-308226

(51) Int. Cl.
G02B 15/14  (2006.01)
(52) U.S. Cl. ..................... 359/682; 359/680; 359/685
(58) Field of Classification Search ................ 359/680, 359/682, 685, 689
See application file for complete search history.

(56) References Cited

U.S. PATENT DOCUMENTS

| | | | |
|---|---|---|---|
| 6,040,949 A | 3/2000 | Ohno | 359/689 |
| 6,246,529 B1 | 6/2001 | Sensui | 359/680 |
| 6,515,805 B1 | 2/2003 | Hagimori | 359/691 |
| 6,522,476 B1 | 2/2003 | Koreeda | 359/681 |
| 6,621,642 B1 | 9/2003 | Hagimori | 359/682 |
| 6,781,768 B1 | 8/2004 | Minefuji | 359/689 |
| 2003/0197949 A1 | 10/2003 | Eguchi | 359/680 |
| 2004/0012859 A1 | 1/2004 | Minefuji | 359/680 |
| 2004/0051958 A1 | 3/2004 | Yoneyama | 359/681 |

FOREIGN PATENT DOCUMENTS

| | | |
|---|---|---|
| JP | 10-206732 | 8/1998 |
| JP | 11-237549 | 8/1999 |
| JP | 2002-014284 | 1/2002 |
| JP | 2004-014284 | 1/2002 |
| JP | 2002-055278 | 2/2002 |
| JP | 2002-082284 | 3/2002 |

OTHER PUBLICATIONS

U.S. Appl. No. 10/929,366 to Saori, filed Aug. 31, 2004.
U.S. Appl. No. 10/940,704 to Eguchi, filed Sep. 15, 2004.

Primary Examiner—David N. Spector
(74) Attorney, Agent, or Firm—Greenblum & Bernstein, P.L.C.

(57) ABSTRACT

A zoom lens system includes a negative first lens group, a positive second lens group, and a positive third lens group. Upon zooming from the short focal length extremity to the long focal length extremity, a distance between the first lens group and the second lens group decreases, and a distance between the second lens group and the third lens group increases. When zooming is being performed, the third lens group remains stationary, and the first lens group and the second lens group are moveable along the optical axis of the zoom lens system; and the zoom lens system satisfies the following conditions:

$3.0 < f_3/f_2 < 3.5$  (1)

$1.4 < |f_1/f_W| < 2.0$  (2)

$0.8 < f_2/f_W < 1.5$  (3)

wherein
 $f_1$ designates the focal length of the first lens group;
 $f_2$ designates the focal length of the second lens group;
 $f_3$ designates the focal length of the third lens group; and
 fw designates the focal length of the entire zoom lens system at the short focal length extremity.

7 Claims, 7 Drawing Sheets

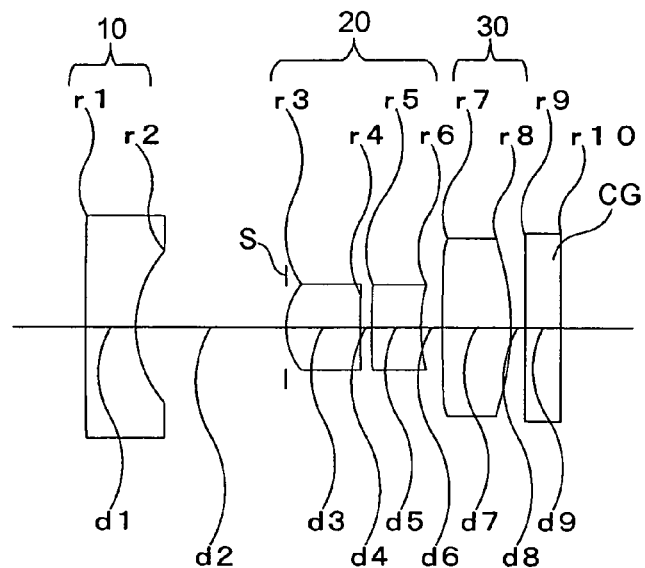
Fig. 1
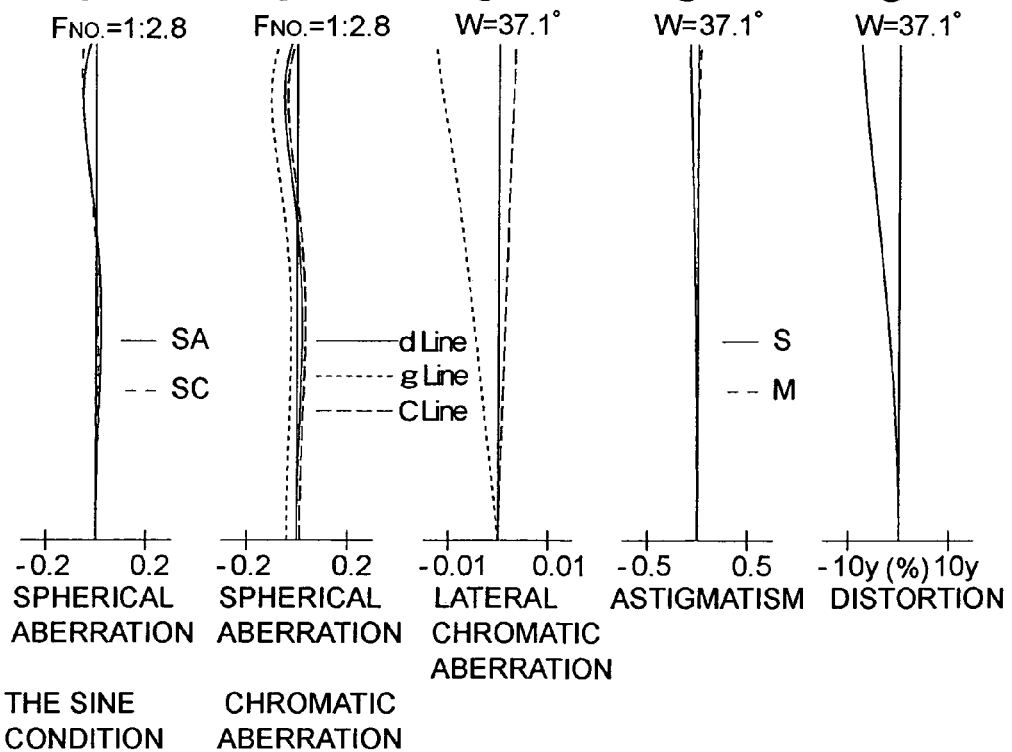

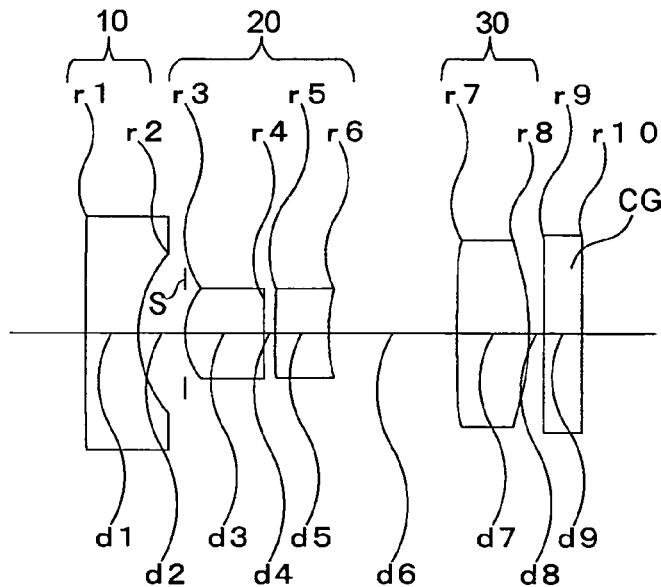
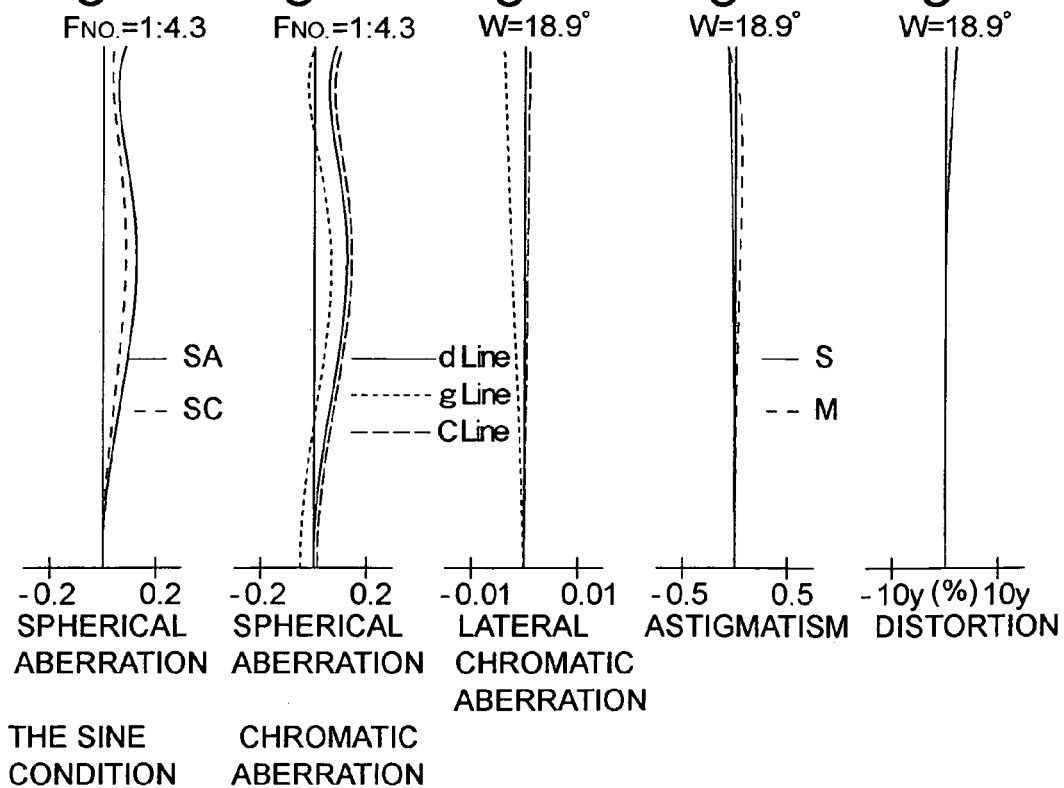

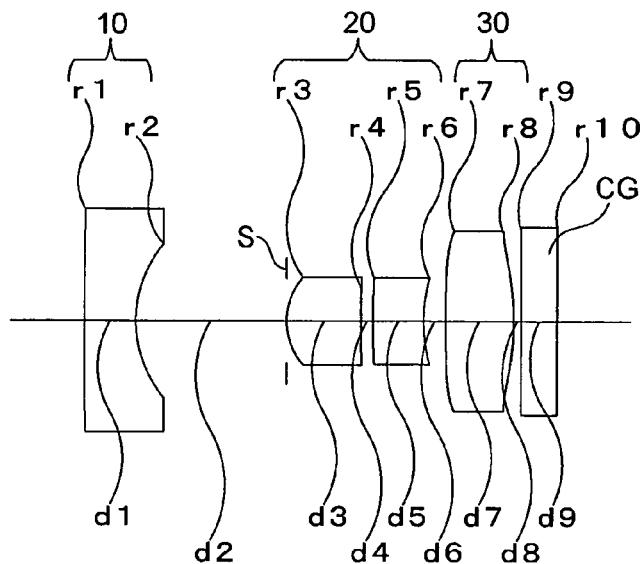
Fig. 5
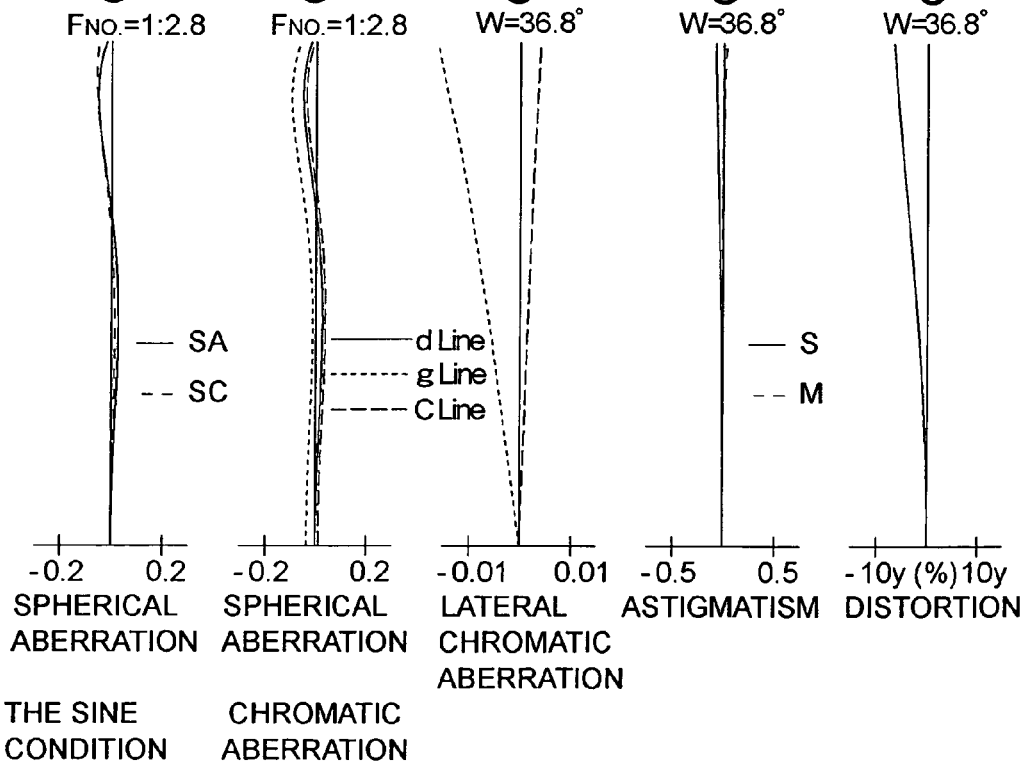

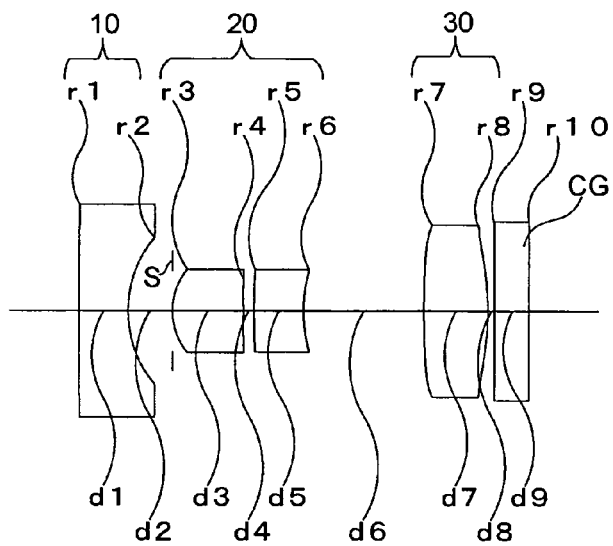
Fig. 7
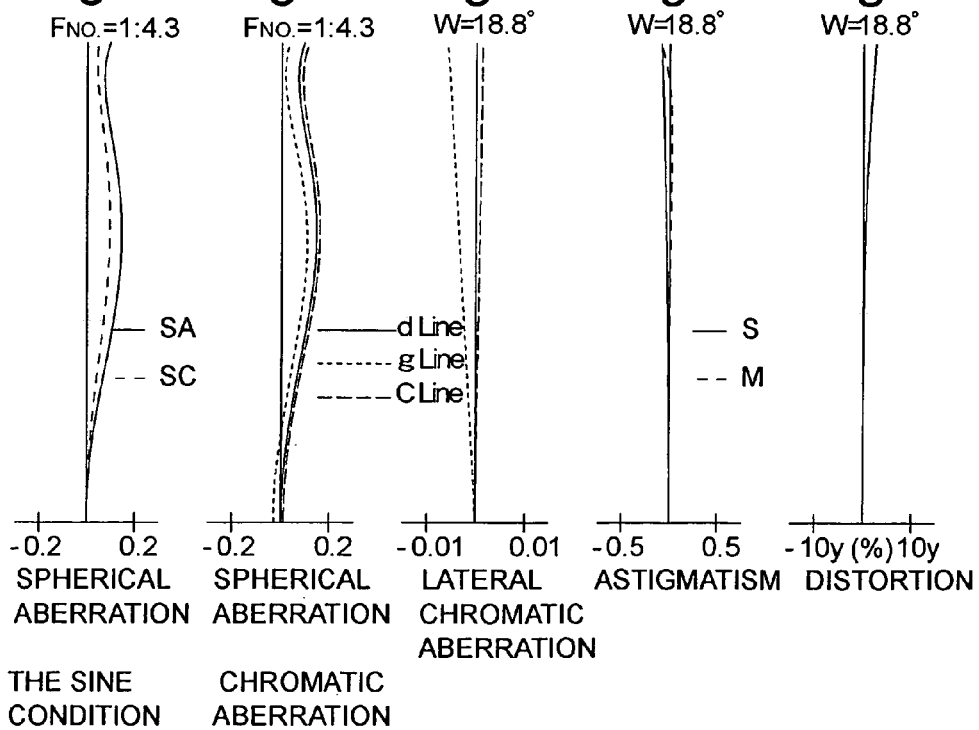

ZOOM LENS SYSTEM

BACKGROUND OF THE INVENTION

1. Field of the Invention

The present invention relates to a zoom lens system for an electronic still camera (digital camera) having a wide angle-of-view (i.e., a shorter focal length at the short focal length extremity) and a zoom ratio of approximately 3.

2. Description of the Prior Art

In recent years, a digital camera is not only used as a camera per se, but also provided in a portable data handset (PDA: Personal Digital Assistant) and a mobile phone, etc. An imaging device (imaging module), such as a CCD and a CMOS, used for such a digital camera has been required to be very much miniaturized. Therefore an imaging device with a relatively smaller effective imaging area has often been used; and there have been many digital cameras whose optical system is constituted by a smaller number of lens elements.

As a small-sized zoom lens system which has a smaller number of lens elements, a negative-lead type lens system has been frequently employed. In such a lens system, there are at least two advantages, i.e., (i) the focal length of the lens system can be made shorter at the short focal length extremity, and (ii) telecentricity on the image side can be maintained.

For example, the following Japanese Unexamined Patent Publications (hereinafter, JUPP) have disclosed a negative-lead type lens system of three (and two)-lens-group arrangement, and drawbacks thereof will be discussed hereinafter:

JUPP No.2002-82284, JUPP No.2002-55278,

JUPP NO.2002-14284, JUPP No.Hei-11-237549, and JUPP No.Hei-10-206732.

In JUPP No. 2002-82284, the second lens group (a zooming lens group) is constituted by two positive lens elements. Consequently, chromatic aberration in this zooming lens group cannot be corrected.

In JUPP No. 2002-55278, the third lens group has a weaker positive refractive power (hereinafter, positive power). However, zooming is mainly performed by the first lens group and the second lens group. As a result, the third lens group does not substantially contribute to zooming, so that the zoom lens system has not sufficiently been miniaturized.

In JUPP No. 2002-14284, the first lens group is constituted by two lens elements or more. Accordingly, aberrations can be adequately corrected; however, the zoom lens system cannot be sufficiently miniaturized.

In JUPP No. Hei-11-237549, the power of each lens group is weak, and the power of the second lens group is particularly weak. Consequently, the distance between the first lens group and the second lens group becomes longer, so that the overall length of the zoom lens system becomes longer.

In JUPP No. Hei-10-206732, the second lens group is constituted by three lens elements, so that sufficient miniaturization is not achieved.

If an attempt is made to make the overall length of the zoom lens system shorter, it is understood that the power of each lens group is made stronger so that the traveling distances of the lens groups become shorter. However, if the power of a lens group is made stronger, aberrations become larger. Consequently, it becomes difficult to correct aberrations suitably over the entire zooming range.

SUMMARY OF THE INVENTION

The present invention, with consideration of the above-described drawbacks, provides a small-sized and high-quality zoom lens system having a negative lens group, a positive lens group and a positive lens group, in this order from the object.

According to an aspect of the present invention, there is provided a zoom lens system including a first lens group having a negative refractive power (hereinafter, a negative first lens group), a second lens group having a positive refractive power (hereinafter, a positive second lens group), and a third lens group having a positive refractive power (hereinafter, a positive third lens group), in this order from the object.

Upon zooming from the short focal length extremity to the long focal length extremity, a distance between the negative first lens group and the positive second lens group decreases, and a distance between the positive second lens group and the positive third lens group increases.

When zooming is being performed, the positive third lens group remains stationary, and the negative first lens group and the positive second lens group are moveable along the optical axis of the zoom lens system; and the zoom lens system satisfies the following conditions:

$$3.0 < f_3/f_2 < 3.5 \tag{1}$$

$$1.4 < |f_1/f_W| < 2.0 \tag{2}$$

$$0.8 < f_2/f_W < 1.5 \tag{3}$$

wherein $f_1$ designates the focal length of the negative first lens group;

$f_2$ designates the focal length of the positive second lens group;

$f_3$ designates the focal length of the positive third lens group; and $f_W$ designates the focal length of the entire zoom lens system at the short focal length extremity.

The zoom lens system of the present invention preferably satisfies the following condition:

$$1.0 < T_2/\text{ymax} < 2.0 \tag{4}$$

wherein $T_2$ designates a distance from the most object-side surface to the most image-side surface of the positive second lens group; and ymax designates the maximum image height.

The negative first lens group is preferably constituted by a negative single meniscus lens element having the concave surface facing toward the image.

The positive second lens group is preferably constituted by a positive lens element and a negative lens element.

The positive third lens group is preferably constituted by a positive single lens element.

In the zoom lens system of the present invention, if the position of the negative first lens group at the short focal length extremity is arranged to be identical to the position thereof at the long focal length extremity, a two-focal-length switching lens system can be achieved by only moving the positive second lens group to either end of a moving range of the positive second lens group.

According to another aspect of the present invention, there is provided a zoom lens system including a negative first lens group, a positive second lens group, and a positive third lens group, in this order from the object.

Upon zooming from the short focal length extremity to the long focal length extremity, a distance between the negative first lens group and the positive second lens group decreases, and a distance between the positive second lens group and the positive third lens group increases. When zooming is being performed, the positive third lens group remains stationary, and the negative first lens group and the positive second lens group are moveable along the optical axis of the zoom lens system; and the zoom lens system satisfies the following condition:

$$1.0 < T_2/\text{ymax} < 2.0 \qquad (4)$$

wherein $T_2$ designates a distance from the most object-side surface to the most image-side surface of the positive second lens group; and ymax designates the maximum image height.

The present disclosure relates to subject matter contained in Japanese Patent Application No. 2003-308226 (filed on Sep. 1, 2003) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the zoom lens system at the short focal length extremity, according to a first embodiment of the present invention;

FIGS. 2A, 2B, 2C, 2D and 2E show aberrations occurred in the lens arrangement shown in FIG. 1;

FIG. 3 is a lens arrangement of the zoom lens system, shown in FIG. 1, at the long focal length extremity;

FIGS. 4A, 4B, 4C, 4D and 4E show aberrations occurred in the lens arrangement shown in FIG. 3;

FIG. 5 is a lens arrangement of the zoom lens system at the short focal length extremity, according to a second embodiment of the present invention;

FIGS. 6A, 6B, 6C, 6D and 6E show aberrations occurred in the lens arrangement shown in FIG. 5;

FIG. 7 is a lens arrangement of the zoom lens system, shown in FIG. 5, at the long focal length extremity;

FIGS. 8A, 8B, 8C, 8D and 8E show aberrations occurred in the lens arrangement shown in FIG. 7;

DESCRIPTION OF THE PREFERRED EMBODIMENTS

Figure 13:
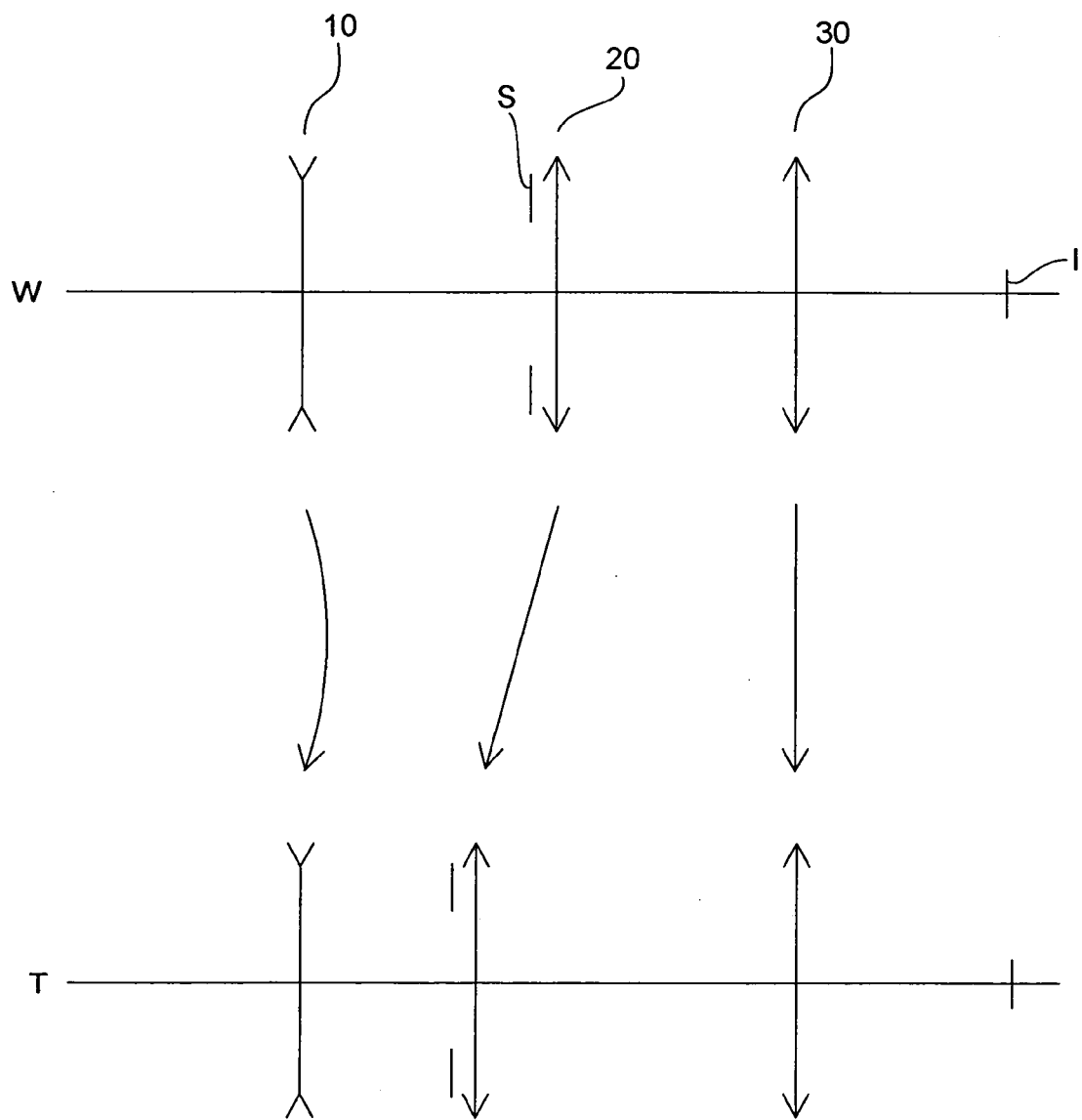
FIG. 13 shows lens-group moving paths upon zooming, with respect to the zoom lens system according to the present invention.

The zoom lens system of the present invention, as shown in the lens-group moving paths of FIG. 13, is constituted by a negative first lens group 10, a positive second lens group 20, and a positive third lens group 30, in this order from the object.

Upon zooming from the short focal length extremity (W) to the long focal length extremity (T), the negative first lens group 10 moves toward the image and then moves back toward the object; the positive second lens group 20 moves toward the object; and the positive third lens group 30 remains stationary. As a result, the distance between the negative first lens group and the positive second lens group decreases; and the distance between the positive second lens group and the positive third lens group increases.

In FIG. 13, the letter "I" indicates the image plane; and in a digital camera, a filter group is provided immediately in front of the image plane I.

A diaphragm S is provided between the negative first lens group 10 and the positive second lens group 20, and moves together with the positive second lens group 20 upon zooming.

Focusing is performed by moving at least any one of the negative first lens group 10, the positive second lens group 20 and the positive third lens group 30.

In the case where the zoom lens system is used as a two-focal-length lens system, the position of the negative first lens group 10 at the short focal length extremity is arranged to be identical to the position thereof at the long focal length extremity. In other words, at both the short and long focal length extremities, the distance from the most image-side surface of the negative first lens group 10 to the image plane I is unchanged. Due to this arrangement, by only moving the positive second lens group 20 to either end of a moving range of the positive second lens group 20, the two focal lengths, i.e., the long focal length and the short focal length, can be obtained.

Due to the above-explained arrangement of the negative first lens group 10, the zoom lens system can be used as the so-called two-focal-length switching lens system, since the long focal length and the short focal length can be obtained by only moving the positive second lens group 20 between the ends of the moving range of the positive second lens group 20.

The negative first lens group 10 is preferably constituted by a negative single meniscus lens element having the concave surface facing toward the image, for the purpose of further miniaturization of the zoom lens system.

The positive second lens group 20 is most preferably constituted by a positive lens element and a negative lens element due to the following reasons: (i) the positive second lens group 20 is designed to have the largest zooming function, and therefore providing one positive lens element and one negative lens element is desirable to reduce aberrations occurred upon zooming; and (ii) it is understood that the smaller the number of lens elements is, the more the zoom lens system can be miniaturized.

The positive third lens group 30 is preferably constituted by a positive biconvex single lens element.

Condition (1) specifies the ratio of the focal length of the positive third lens group 30 to that of the positive second lens group 20 in order to (i) secure telecentricity, (ii) to suitably correct aberrations over the entire zooming range (or, at each focal length extremities), and (iii) to achieve further miniaturization of the zoom lens system, while the positive third lens group 30 remains stationary upon zooming.

If $f_3/f_2$ exceeds the upper limit of condition (1), the power of the positive third lens group 30 becomes weaker. Consequently, most of the zooming function is imposed on the positive second lens group 20, so that the change in aberrations upon zooming becomes larger. If an attempt is made to reduce the change in aberrations upon zooming, the thickness of the positive second lens group 20 has to be increased. As a result, further miniaturization of the zoom lens system cannot be achieved.

If $f_3/f_2$ exceeds the lower limit of condition (1), the power of the positive second lens group 20 becomes weaker. Consequently, the traveling distance of the positive second lens group 20 upon zooming becomes longer, and further miniaturization of the zoom lens system cannot be achieved.

Condition (2) specifies the focal length of the negative first lens group 10 for the purpose of correcting aberrations suitably while the traveling distance of each lens group upon zooming is made shorter.

If $|f_1/f_W|$ exceeds the upper limit of condition (2), the power of the negative first lens group 10 becomes weaker. Consequently, the traveling distance of the negative first lens group 10 upon zooming becomes longer, which is disadvantageous for further miniaturization of the zoom lens system.

If $|f_1/f_W|$ exceeds the lower limit of condition (2), the power of the negative first lens group 10 becomes too strong. Consequently, the correcting of aberrations becomes difficult, while further miniaturization of the zoom lens system can advantageously be achieved due to the strong power (i.e., a shorter traveling distance) of the negative first lens group 10.

More preferably, the following condition is satisfied instead of condition (2):

$$1.6 < |f_1/f_W| < 1.8 \quad (2')$$

Condition (3) specifies the focal length of the positive second lens group 20 for the purpose of correcting aberrations suitably while the traveling distance of each lens group upon zooming is made shorter.

If $f_2/f_W$ exceeds the upper limit of condition (2), the power of the positive second lens group 20 becomes weaker. Consequently, the traveling distance of the positive second lens group 20 upon zooming becomes longer, which is disadvantageous for further miniaturization of the zoom lens system.

If $f_2/f_W$ exceeds the lower limit of condition (2), the power of the positive second lens group 20 becomes too strong. Consequently, the correcting of aberrations becomes difficult, while further miniaturization of the zoom lens system can advantageously be achieved due to the strong power (i.e., a shorter traveling distance) of the positive second lens group 20.

More preferably, the following condition is satisfied instead of condition (3):

$$0.8 < f_2/f_W < 1.2 \quad (3')$$

Condition (4) is provided for the purpose of attaining both the correcting of aberrations and further miniaturization of the zoom lens system.

If $T_2/ymax$ exceeds the upper limit of condition (4), the thickness of the positive second lens group 20 becomes larger, and further miniaturization of the zoom lens system cannot sufficiently be achieved.

If $T_2/ymax$ exceeds the lower limit of condition (4), the correcting of aberrations becomes insufficient. Moreover, the lens elements become too thin, and it becomes difficult to manufacture such thin lens elements.

Condition (4) can independently be applied to a zoom lens system which does not satisfy conditions (1) to (3), and in which (i) a negative first lens group, a positive second lens group, and a positive third lens group are provided in this order from the object; (ii) upon zooming from the short focal length extremity to the long focal length extremity, a distance between the negative first lens group and the positive second lens group decreases, and a distance between the positive second lens group and the positive third lens group increases; and (iii) when zooming is being performed, the positive third lens group remains stationary, and the negative first lens group and the positive second lens group are moveable along the optical axis of the zoom lens system.

Even in the case where condition (4) is independently applied to the above-explained zoom lens system, both of the correcting of aberrations and further miniaturization of the zoom lens system can be achieved to some extent.

Specific numerical data of the embodiments will be described hereinafter.

In the diagrams showing spherical aberration and the sine condition, SA designates spherical aberration, and SC designates the sine condition.

In the diagrams of chromatic aberration (on-axis chromatic aberration) represented by spherical aberration, the solid line and the two types of dotted lines respectively indicate spherical aberrations with respect to the d, g and C lines.

In the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

In the tables, $F_{NO}$ designates the f-number, f designates the focal length of the entire wide-angle zoom lens system, $f_B$ designates the back focal distance (the equivalent air thickness along the optical axis from the most image-side surface of the cover glass CG to the image plane of the imaging device (CCD)), W designates the half angle-of-view (°), r designates the radius of curvature, d designates the lens-element thickness or distance between lens elements, $N_d$ designates the refractive index of the d-line, and ν designates the Abbe number.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10}\ldots$$

wherein:

c designates a curvature of the aspherical vertex (1/r);
y designates a distance from the optical axis;
K designates the conic coefficient;
A4 designates a fourth-order aspherical coefficient;
A6 designates a sixth-order aspherical coefficient;
A8 designates a eighth-order aspherical coefficient; and
A10 designates a tenth-order aspherical coefficient.

[Embodiment 1]

FIG. 1 is the lens arrangement of the zoom lens system at the short focal length extremity. FIGS. 2A through 2E show aberrations occurred in the lens arrangement shown in FIG. 1. FIG. 3 is the lens arrangement of the zoom lens system, shown in FIG. 1, at the long focal length extremity. FIGS. 4A through 4E show aberrations occurred in the lens arrangement shown in FIG. 3. Table 1 shows the numerical data of the first embodiment.

The negative first lens group 10 is constituted by a negative single meniscus lens element having the concave surface facing toward the image.

The positive second lens group 20 is constituted by a positive biconvex lens element and a negative meniscus lens element having the concave surface facing toward the image, in this order from the object.

The positive third lens group 30 is constituted by a positive biconvex single lens element.

A cover glass (filter group) CG is provided between the third lens group 30 and the CCD. The size of the CCD is 1/7 inch (diagonal size (maximum image height)=1.4 mm). The diaphragm S is provided 0.20 mm in front of (on the object side) the second lens group 20 (surface No. 3).

TABLE 1

FNO. = 1:2.8–4.3
f = 2.00–4.00
W = 37.1–18.9
fB = 0.36–0.36

| Surf. No. | r | d | Nd | ν |
|---|---|---|---|---|
| 1 | 73.462 | 0.70 | 1.48749 | 70.2 |
| 2* | 1.609 | 2.08–0.62 | | |
| 3* | 0.940 | 1.04 | 1.48749 | 70.2 |
| 4* | −11.244 | 0.16 | | |
| 5 | 12.746 | 0.70 | 1.62004 | 36.3 |
| 6 | 2.374 | 0.30–1.71 | | |
| 7* | 19.388 | 0.96 | 1.49176 | 57.4 |
| 8* | −3.845 | 0.20 | | |
| 9 | infinity | 0.50 | 1.51633 | 64.1 |
| 10 | infinity | — | | |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 2 | 0.00 | | $-0.59022 \times 10^{-2}$ | |
| 3 | 0.00 | $-0.46124 \times 10^{-1}$ | $0.18269 \times 10^{-0}$ | $-0.34874 \times 10^{-0}$ |
| 4 | 0.00 | $0.34242 \times 10^{-0}$ | | $0.61481 \times 10^{-0}$ |
| 7 | 0.00 | $-0.19727 \times 10^{-1}$ | | $0.12566 \times 10^{-1}$ |
| 8 | 0.00 | $-0.17928 \times 10^{-1}$ | | $0.79744 \times 10^{-2}$ |

[Embodiment 2]

FIG. 5 is the lens arrangement of the zoom lens system at the short focal length extremity. FIGS. 6A through 6E show aberrations occurred in the lens arrangement shown in FIG. 5. FIG. 7 is the lens arrangement of the zoom lens system, shown in FIG. 5, at the long focal length extremity. FIGS. 8A through 8E show aberrations occurred in the lens arrangement shown in FIG. 7. Table 2 shows the numerical data of the second embodiment.

The basic lens arrangement of the second embodiment is the same as that of the first embodiment. The diaphragm S is provided 0.20 mm in front of (on the object side) the second lens group 20 (surface No. 3).

TABLE 2

FNO. = 1:2.8–4.3
f = 2.00–4.00
W = 36.8–18.8
fB = 0.50–0.50

| Surf. No. | r | d | Nd | ν |
|---|---|---|---|---|
| 1 | 132.171 | 0.70 | 1.49176 | 57.4 |
| 2* | 1.641 | 2.09–0.64 | | |
| 3* | 0.944 | 1.01 | 1.48749 | 70.2 |
| 4* | −10.097 | 0.16 | | |
| 5 | 12.304 | 0.70 | 1.62004 | 36.3 |
| 6 | 2.253 | 0.30–1.74 | | |
| 7* | 16.346 | 0.94 | 1.49176 | 57.4 |
| 8* | −3.851 | 0.10 | | |
| 9 | infinity | 0.50 | 1.51633 | 64.1 |
| 10 | infinity | — | | |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 2 | 0.00 | | $-0.35237 \times 10^{-2}$ | |
| 3 | 0.00 | $-0.45808 \times 10^{-1}$ | $0.20903 \times 10^{-0}$ | $-0.36172 \times 10^{-0}$ |
| 4 | 0.00 | $0.35063 \times 10^{-0}$ | | $0.65559 \times 10^{-0}$ |
| 7 | 0.00 | $0.80078 \times 10^{-2}$ | | $0.81083 \times 10^{-2}$ |
| 8 | 0.00 | $0.10610 \times 10^{-1}$ | | $0.70980 \times 10^{-2}$ |

[Embodiment 3]

Figure 9:
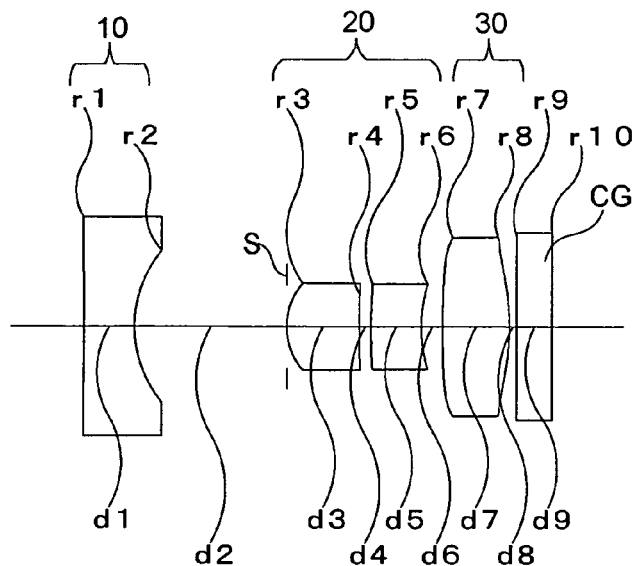
FIG. 9 is a lens arrangement of the zoom lens system at the short focal length extremity, according to a third embodiment of the present invention.
Figures 10A, 10B, 10C, 10D, 10E:
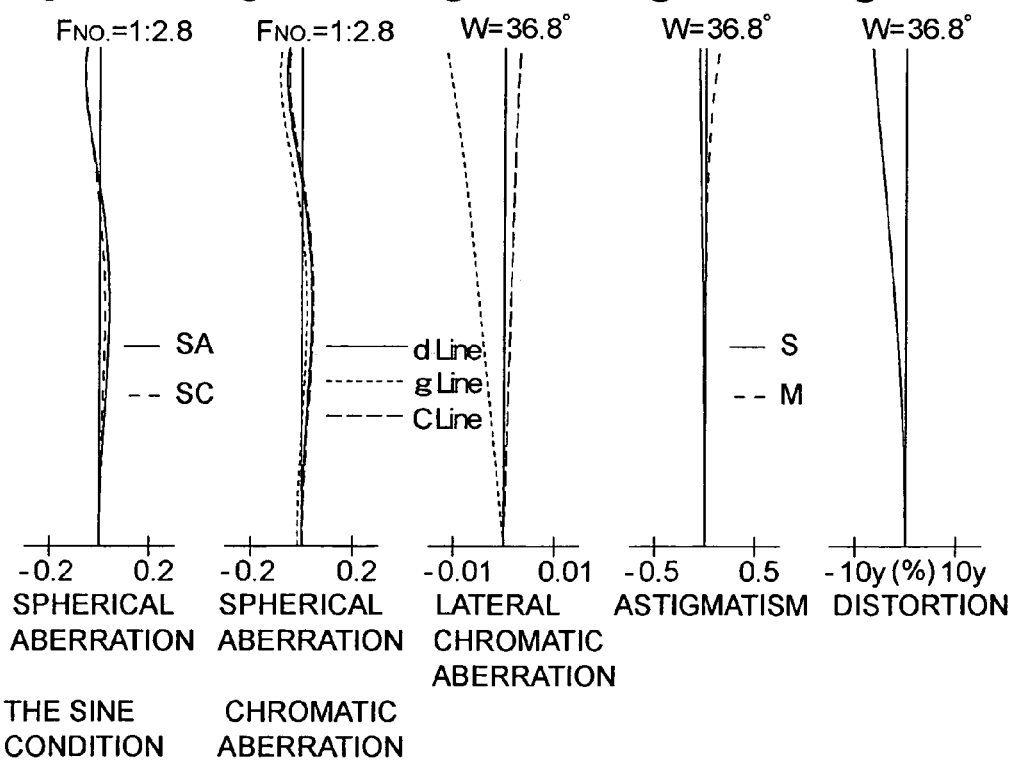
FIGS. 10A, 10B, 10C, 10D and 10E show aberrations occurred in the lens arrangement shown in FIG. 9.
Figure 11:
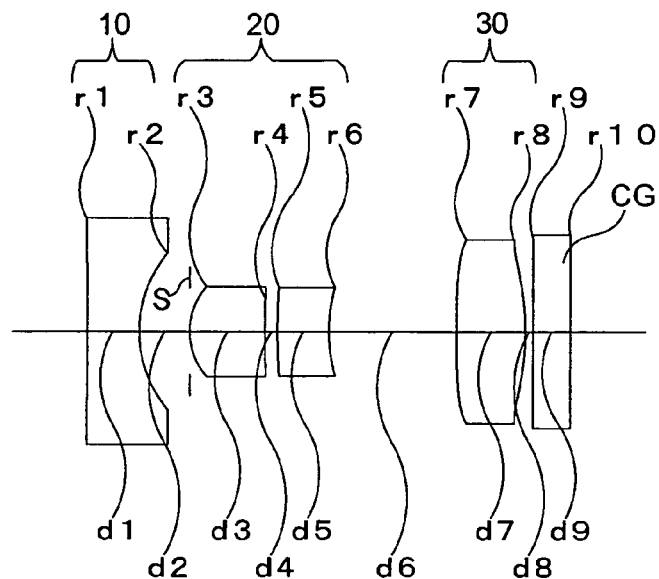
FIG. 11 is a lens arrangement of the zoom lens system, shown in FIG. 9, at the long focal length extremity.
Figures 12A, 12B, 12C, 12D, 12E:
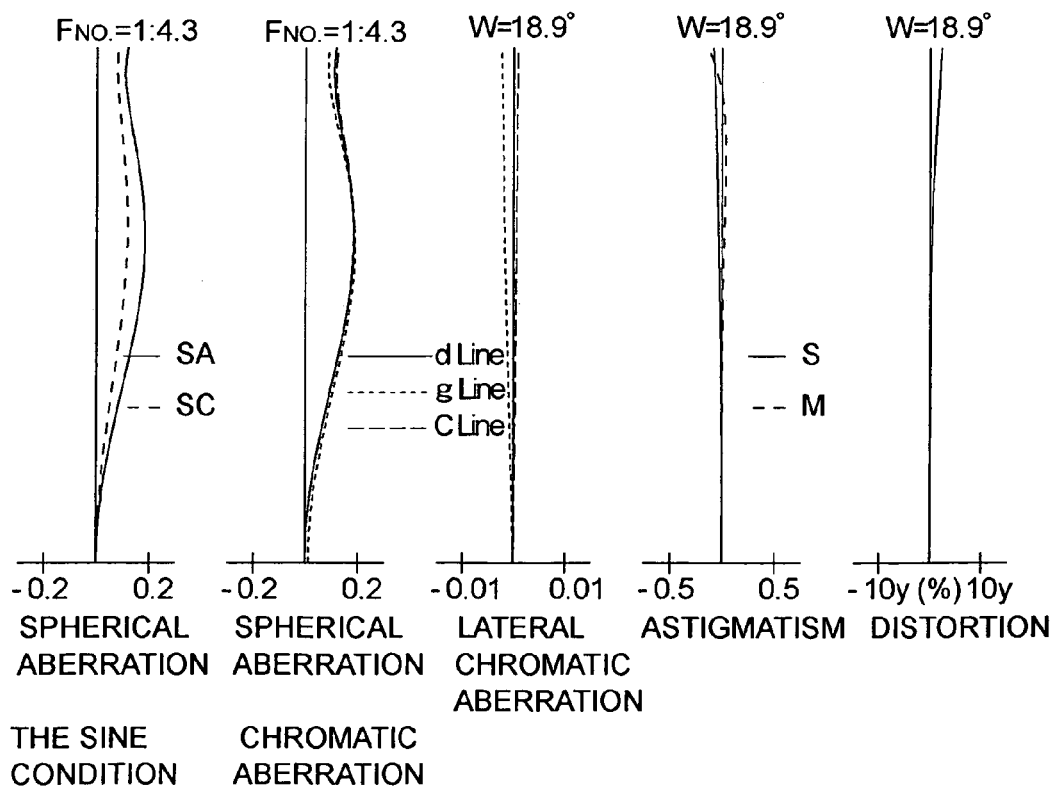
FIGS. 12A, 12B, 12C, 12D and 12E show aberrations occurred in the lens arrangement shown in FIG. 11.

FIG. 9 is the lens arrangement of the zoom lens system at the short focal length extremity. FIGS. 10A through 10E show aberrations occurred in the lens arrangement shown in FIG. 9. FIG. 11 is the lens arrangement of the zoom lens system, shown in FIG. 9, at the long focal length extremity. FIGS. 12A through 12E show aberrations occurred in the lens arrangement shown in FIG. 11. Table 3 shows the numerical data of the third embodiment.

The basic lens arrangement of the third embodiment is the same as that of the first embodiment except that the negative first lens group 10 is constituted by a biconcave negative single lens element. The diaphragm S is provided 0.20 mm in front of (on the object side) the second lens group 20 (surface No. 3).

TABLE 3

FNO. = 1:2.8–4.3
f = 2.00–4.00
W = 36.8–18.9
fB = 0.50–0.50

| Surf. No. | r | d | Nd | ν |
|---|---|---|---|---|
| 1 | −116.226 | 0.70 | 1.48749 | 70.2 |
| 2* | 1.685 | 2.11–0.67 | | |
| 3* | 0.950 | 1.01 | 1.49700 | 81.6 |
| 4* | −8.761 | 0.16 | | |
| 5 | 9.147 | 0.70 | 1.75520 | 27.5 |
| 6 | 2.140 | 0.30–1.73 | | |
| 7* | 19.977 | 0.92 | 1.49176 | 57.4 |
| 8* | −3.512 | 0.10 | | |
| 9 | infinity | 0.50 | 1.51633 | 64.1 |
| 10 | infinity | — | | |

*designates the aspherical surface which is rotationally symmetrical with respect to the optical axis.

Aspherical surface data (the aspherical surface coefficients not indicated are zero (0.00)):

| Surf. No. | K | A4 | A6 | A8 |
|---|---|---|---|---|
| 2 | 0.00 | | $-0.12835 \times 10^{-2}$ | |
| 3 | 0.00 | $-0.57036 \times 10^{-1}$ | $0.22879 \times 10^{-0}$ | $-0.27586 \times 10^{-0}$ |
| 4 | 0.00 | $0.34433 \times 10^{-0}$ | | $0.12837 \times 10$ |

-continued

| Surf. No. | K | A4 | A6 | A8 |
|---|---|---|---|---|
| 7 | 0.00 | 0.11801 × 10⁻¹ | | 0.10174 × 10⁻¹ |
| 8 | 0.00 | 0.10632 × 10⁻¹ | | 0.92579 × 10⁻² |

The numerical values of each embodiment for each condition are shown in Table 4.

TABLE 4

| | Embod.1 | Embod.2 | Embod.3 |
|---|---|---|---|
| Condition (1) | 3.476 | 3.157 | 3.046 |
| Condition (2, 2') | 1.670 | 1.693 | 1.701 |
| Condition (3, 3') | 1.014 | 1.020 | 1.010 |
| Condition (4) | 1.35 | 1.34 | 1.34 |

As can be understood from Table 4, each embodiment satisfies each condition. Furthermore, the various aberrations are well corrected.

According to the above description, a small-sized and high-quality zoom lens system, including a negative lens group, a positive lens group and a positive lens group, in this order from the object, can be obtained.

What is claimed is:

1. A zoom lens system comprising a negative first lens group, a positive second lens group, and a positive third lens group, in this order from an object,
   wherein upon zooming from the short focal length extremity to the long focal length extremity, a distance between said negative first lens group and said positive second lens group decreases, and a distance between said positive second lens group and said positive third lens group increases;
   wherein when zooming is being performed, said positive third lens group remains stationary, and said negative first lens group and said positive second lens group are moveable along the optical axis of said zoom lens system; and
   wherein said zoom lens system satisfies the following conditions:

$3.0 < f_3/f_2 < 3.5$ $1.4 < |f_1/f_W| < 2.0$ $0.8 < f_2/f_W < 1.5$ wherein
   $f_1$ designates the focal length of said negative first lens group;
   $f_2$ designates the focal length of said positive second lens group;
   $f_3$ designates the focal length of said positive third lens group; and
   $f_W$ designates the focal length of the entire zoom lens system at the short focal length extremity.

2. The zoom lens system according to claim 1, further satisfying the following condition:

$1.0 < T_2/y\text{max} < 2.0$ wherein
   $T_2$ designates a distance from the most object-side surface to the most image-side surface of said positive second lens group; and
   ymax designates the maximum image height.

3. The zoom lens system according to claim 1, wherein said negative first lens group comprises a negative single meniscus lens element having the concave surface facing toward an image.

4. The zoom lens system according to claim 1, wherein said positive second lens group comprises a positive lens element and a negative lens element, in this order from said object.

5. The zoom lens system according to claim 1, wherein said positive third lens group comprises a positive single lens element.

6. The zoom lens system according to claim 1, wherein with respect to an image plane, a position of said negative first lens group at the short focal length extremity is arranged to be identical to the position thereof at the long focal length extremity.

7. A zoom lens system comprising a negative first lens group, a positive second lens group, and a positive third lens group, in this order from an object,
   wherein upon zooming from the short focal length extremity to the long focal length extremity, a distance between said negative first lens group and said positive second lens group decreases, and a distance between said positive second lens group and said positive third lens group increases;
   wherein when zooming is being performed, said positive third lens group remains stationary, and said negative first lens group and said positive second lens group are moveable along the optical axis of said zoom lens system; and
   wherein said zoom lens system satisfies the following condition:

$1.0 < T_2/y\text{ max} < 2.0$ wherein
   $T_2$ designates a distance from the most object-side surface to the most image-side surface of said positive second lens group; and
   ymax designates the maximum image height.

* * * * *